US008147999B2

(12) United States Patent
Wu

(10) Patent No.: US 8,147,999 B2
(45) Date of Patent: Apr. 3, 2012

(54) CLOSURE ASSEMBLY WITH LOW VAPOR TRANSMISSION FOR ELECTROCHEMICAL CELL

(75) Inventor: James X. Wu, North Olmsted, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 941 days.

(21) Appl. No.: 12/136,910

(22) Filed: Jun. 11, 2008

(65) Prior Publication Data

US 2009/0311583 A1    Dec. 17, 2009

(51) Int. Cl.
H01M 2/02 (2006.01)
H01M 2/04 (2006.01)
H01M 2/12 (2006.01)

(52) U.S. Cl. ............. 429/57; 429/82; 429/175; 429/185
(58) Field of Classification Search ............. 429/57–59, 429/164, 166, 170–172, 175, 176, 82, 185
See application file for complete search history.

(56) References Cited

U.S. PATENT DOCUMENTS

| | | | |
|---|---|---|---|
| 3,279,953 A | 10/1966 | Bierdumphel | |
| 3,852,117 A | 12/1974 | Fraioli | |
| 4,345,611 A | 8/1982 | Ikeda et al. | |
| 4,783,383 A | 11/1988 | Machida et al. | |
| 4,855,195 A | 8/1989 | Georgopoulos et al. | |
| 4,963,446 A | 10/1990 | Roels et al. | |
| 5,015,542 A | 5/1991 | Chaney, Jr. et al. | |
| 5,043,235 A | 8/1991 | Seefeldt et al. | |
| 5,080,984 A | 1/1992 | Thibault | |
| 5,156,930 A | 10/1992 | Daio et al. | |
| 5,418,084 A | 5/1995 | Georgopoulos | |
| 5,462,820 A | 10/1995 | Tanaka | |
| 5,532,075 A | 7/1996 | Alexandres et al. | |
| 5,609,972 A | 3/1997 | Kaschmitter et al. | |
| 5,677,076 A | 10/1997 | Sato et al. | |
| 5,741,606 A | 4/1998 | Mayer et al. | |
| 5,747,187 A | 5/1998 | Byon | |

(Continued)

FOREIGN PATENT DOCUMENTS

CA     2198418 A1     8/1998

(Continued)

OTHER PUBLICATIONS

Patent Cooperation Treaty (PCT), International Search Report and Written Opinion for Application PCT/US2009/003471 filed Jun. 9, 2009, Mailed Sep. 24, 2009, European Patent Office, Netherlands.

(Continued)

*Primary Examiner* — Gregg Cantelmo
(74) *Attorney, Agent, or Firm* — Robert C. Baraona

(57) ABSTRACT

A closure assembly for an electrochemical cell including a container and an end assembly sealing an open end of the container in order to minimize mass or weight loss of the cell due to electrolyte vapor transmission is disclosed. The end assembly is provided with a vent member capable of venting a fluid when the pressure within the cell exceeds a predetermined limit; a contact member operatively in electrical contact with a conductive contact of the end assembly and a current collector of an electrode of the cell; and an insulating, polymeric seal member disposed at least between conductive components of the closure assembly having different polarities. In a preferred embodiment, the seal member has a selected dimensional ratio in order to minimize vapor transmission of the electrolyte through the seal member.

18 Claims, 2 Drawing Sheets

U.S. PATENT DOCUMENTS

| | | |
|---|---|---|
| 5,766,790 A | 6/1998 | Kameishi et al. |
| 5,876,868 A | 3/1999 | Tanida |
| 6,207,320 B1 | 3/2001 | Song et al. |
| 6,265,097 B1 | 7/2001 | Konno et al. |
| 6,444,348 B1 | 9/2002 | Saijo et al. |
| 6,451,473 B1 | 9/2002 | Saito et al. |
| 6,468,692 B1 | 10/2002 | Nemoto et al. |
| 6,497,978 B1 | 12/2002 | Takada et al. |
| 6,531,242 B1 | 3/2003 | Sugimoto et al. |
| 6,610,437 B2 | 8/2003 | Tsurutani et al. |
| 6,610,438 B2 | 8/2003 | Okumura et al. |
| 6,620,544 B1 | 9/2003 | Shin et al. |
| 6,777,128 B2 | 8/2004 | Kim |
| 6,844,110 B2 | 1/2005 | Enomoto et al. |
| 7,335,439 B2 | 2/2008 | Kawano et al. |
| 7,368,203 B2 | 5/2008 | Iwanaga et al. |
| 2003/0087146 A1 | 5/2003 | Chi |
| 2003/0118902 A1 | 6/2003 | Schubert et al. |
| 2004/0121229 A1 | 6/2004 | Kim et al. |
| 2004/0131940 A1 | 7/2004 | Suzuki et al. |
| 2004/0241541 A1 | 12/2004 | Watanabe et al. |
| 2005/0079404 A1 | 4/2005 | Schubert et al. |
| 2005/0084752 A1 | 4/2005 | Kim |
| 2005/0244706 A1 | 11/2005 | Wu et al. |
| 2006/0046154 A1* | 3/2006 | Webber et al. ............... 429/329 |
| 2006/0115725 A1 | 6/2006 | Kim |
| 2006/0222941 A1 | 10/2006 | Yamashita et al. |
| 2006/0228620 A1 | 10/2006 | Martinson et al. |
| 2007/0015046 A1 | 1/2007 | Kim et al. |
| 2007/0141449 A1 | 6/2007 | Kim |
| 2007/0154781 A1 | 7/2007 | Choi |
| 2007/0202364 A1 | 8/2007 | Uh et al. |
| 2007/0275298 A1 | 11/2007 | Igoris |
| 2008/0070109 A1 | 3/2008 | Oka |

FOREIGN PATENT DOCUMENTS

| | | |
|---|---|---|
| EP | 0391720 A2 | 10/1990 |
| EP | 0415378 A2 | 3/1991 |
| JP | 60148049 A | 8/1985 |
| JP | 06231743 A | 8/1994 |
| JP | 07094161 A | 4/1995 |
| JP | 08077995 A | 3/1996 |
| JP | 08138727 A | 5/1996 |
| JP | 09161753 A | 6/1997 |
| JP | 09213289 A | 8/1997 |
| JP | 09274900 A | 10/1997 |
| JP | 10112300 A | 4/1998 |
| JP | 10223183 A | 8/1998 |
| JP | 10241645 A | 9/1998 |
| JP | 10275604 A | 10/1998 |
| JP | 10340714 A | 12/1998 |
| JP | 110868819 A | 3/1999 |
| JP | 11102676 A | 4/1999 |
| JP | 11111255 A | 4/1999 |
| JP | 11224658 A | 8/1999 |
| JP | 11260334 A | 9/1999 |
| JP | 11283588 A | 10/1999 |
| JP | 2000077078 A | 3/2000 |
| JP | 2000260409 A | 9/2000 |
| JP | 2000277063 A | 10/2000 |
| JP | 2000277067 A | 10/2000 |
| JP | 2001266805 A | 9/2001 |
| JP | 2001332231 A | 11/2001 |
| JP | 2001351609 A | 12/2001 |
| JP | 2002008601 A | 1/2002 |
| JP | 2003303623 A | 10/2003 |
| JP | 2003324523 A | 11/2003 |
| JP | 2005071649 A | 3/2005 |
| JP | 2005093186 A | 4/2005 |
| JP | 2005123017 A | 5/2005 |
| JP | 2005259413 A | 9/2005 |
| JP | 2006216358 A | 8/2006 |
| JP | 2006221988 A | 8/2006 |
| JP | 2006252848 A | 9/2006 |
| JP | 2006278267 A | 10/2006 |
| JP | 2006286561 A | 10/2006 |
| JP | 2007027103 A | 2/2007 |
| JP | 2007141673 A | 6/2007 |
| JP | 2007157609 A | 6/2007 |
| JP | 2007194065 A | 8/2007 |
| JP | 2007207614 A | 8/2007 |
| KR | 20010061300 A | 7/2001 |
| KR | 20060010941 A | 2/2006 |

OTHER PUBLICATIONS

Patent Cooperation Treaty (PCT), International Search Report and Written Opinion for Application PCT/US2007/013276, filed Jun. 6, 2007, mailed Nov. 30, 2007, European Patent Office, Netherlands.

* cited by examiner

CLOSURE ASSEMBLY WITH LOW VAPOR TRANSMISSION FOR ELECTROCHEMICAL CELL

FIELD OF THE INVENTION

The present invention relates to a closure assembly for an electrochemical cell including a container and an end assembly sealing an open end of the container in order to minimize mass or weight loss of the cell due to electrolyte vapor transmission. The end assembly is provided with a vent member capable of venting a fluid when the pressure within the cell exceeds a predetermined limit; a contact member operatively in electrical contact with a conductive contact of the end assembly and a current collector of an electrode of the cell; and an insulating, polymeric seal member disposed at least between conductive components of the closure assembly having different polarities. In a preferred embodiment, the seal member has a selected dimensional ratio in order to minimize vapor transmission of the electrolyte through the seal member.

BACKGROUND OF THE INVENTION

Electrochemical cells, such as those containing lithium metal or alloy as an electrochemically active material, are utilized to provide power to various electronic devices. Electronic device manufacturers often design their devices to accept electrochemical cells having various standardized container exterior dimensions, such as "AA" or "AAA" sizes, or according to ANSI nomenclature, R6 or R03 size containers, respectively. Regulatory bodies such as the United Nations (UN) and Department of Transportation (DOT) have mandated requirements regarding transportation of lithium-containing electrochemical cells. In addition to regulating the maximum lithium content for a certain cell type, UN/DOT regulations require that lithium-containing cells pass mass loss tests, for example a T1 altitude simulation test and a T2 thermal cycling test.

Mass or weight loss in electrochemical cells can be attributed to sources such as diffusion of electrolyte vapor through a sealing member of the cell and electrolyte leakage at sealing interfaces, especially during temperature cycling. The diffusion weight loss can be calculated in one embodiment as a product of the vapor transmission rate of the sealing member, the dimensional ratio of the sealing member, and time. The dimensional ratio can be calculated by dividing the cross section area through which the electrolyte vapor diffuses with the path length that the vapor travels. As cell size decreases, the ratio of the cross section area to the path length does not decrease as quickly as the volume or the mass of the cell. Therefore, relatively small size cells tend to have higher percentage mass loss than larger cells, and it is believed to be more difficult for small size cells to pass UN/DOT mass loss requirements.

Moreover, electrochemical cells such as electrochemically active lithium-containing cells often utilize a non-aqueous electrolyte solution and salt that can be volatile and/or reactive. In view thereof, it is a challenge to construct an electrochemical cell that minimizes mass loss due to vapor transmission.

A further challenge is to provide the cell with a pressure release vent member for releasing or discharging fluid from inside the cell to limit the build-up of internal pressure while maintaining a seal during normal discharge or storage conditions. Without a vent member, the cell may fail, bulge, leak and/or disassemble.

Various pressure release vent member and closure assembly configurations have been used in electrochemical cells.

U.S. Pat. No. 3,279,953 relates to reportedly insulating seals for the metallic casing of sealed battery cells. Specifically, it relates to the insulating seal junction between the open end of the tubular metallic sheet casing and the metallic sheet cover enclosure which also constitutes the two opposite-polarity terminals of sealed cells, such as reportedly used, for example, in flashlights, although similar sealed casings have also been used in other applications.

U.S. Pat. No. 3,852,117 relates to a seal for an electrochemical cell or the like located between the cylinder wall and closure disc at one end of a cylindrical container. The seal comprises opposed circular sealing members formed by deformation of the cylinder wall, bearing against opposite faces of the disc around its rim. The seal is closed by axial compression of the cylinder wall causing deformation of the wall to form the sealing members and to press such members against the closure disc.

U.S. Pat. No. 5,876,868 relates to a battery sealing structure with a reportedly explosion-proof function of preventing battery explosion due to an abnormal increase of the inner pressure in the battery and also which reportedly is capable of excellently sealing the battery which may contribute to improvements in battery assembly operation efficiency.

U.S. Pat. No. 6,207,320 relates to a battery including a can filled with an electrolyte and an electrode assembly. A cap assembly is reportedly close-tightly mounted on an upper end of the can with a gasket interposed between the cap assembly and the upper end. The cap assembly provides a plate provided with a safety groove, a current control member disposed on the plate, a cap cover disposed on the current control member, and a circuit breaker disposed under the plate and supported by a support plate. Also, the circumferential edge of at least one of the plate, the current control member and the cap cover is bent around the support plate.

U.S. Pat. No. 6,620,544 relates to a sealed battery which includes a can for receiving an electric generator, a sealing member crimped on an opening of the can and connected to one of a positive electrode and a negative electrode of the electric generator, a gasket disposed between the can and the sealing member, a cover cap disposed on the sealing member with an insulating member disposed between the cover cap and sealing member, a current control member disposed between the cover cap and the sealing member to reportedly cut-off a flow of current when a temperature of the battery is increased above an allowable level, and a shock absorber disposed between the cover cap and current control member to reportedly prevent shock from being directly transmitted to the current control member.

U.S. Pat. No. 6,777,128 relates to a secondary battery and a fabrication method of the secondary battery which includes a battery unit having a positive electrode plate, a negative electrode plate and a separator interposed therebetween, a can for accommodating the battery unit, a cap assembly having a cap cover, a safety vent and a gasket, where the end of the safety vent is bent inwards to be filled with the gasket provided along the outer periphery of the safety vent reportedly so that the safety vent is inserted into the gasket in a secure manner.

U.S. Publication No. 2005/0244706 relates to an electrochemical cell with a collector assembly for sealing the open end of a cell container. The collector assembly includes a retainer and a contact spring with a peripheral flange, each having a central opening therein. A pressure release vent member disposed between the retainer and the peripheral flange of the contact spring reportedly seals the openings in the retainer and contact spring under normal conditions and ruptures to release pressure from within the cell when the internal pressure exceeds a predetermined limit.

U.S. Publication No. 2006/0228620 relates to a closure assembly and rupturable vent seal adapted for use in an electrochemical battery cell. The vent seal includes a series of peripheral projections that can be folded to insure proper sealing of the vent without wrinkles or overlapping folded portions.

U.S. Publication No. 2007/0015046 relates to a lithium secondary battery having protrusions or depressions formed on a surface of a gasket which makes contact with a safety vent so that gas, which is generated inside the battery, and an electrolyte, reportedly do not leak, thereby reportedly improving safety of the battery.

U.S. Publication No. 2008/0070109 relates to a flat-shaped non-aqueous electrolyte secondary battery that includes an electrode body formed by opposing a positive electrode and a negative electrode while interposing a separator therebetween, an outer case for housing the electrode body, and a sealing plate for sealing an opening of the outer case and an end part of the sealing plate positioned inside the outer case. Also, the sealing plate functions as a positive electrode terminal, the outer case functions as a negative electrode terminal, and a surface layer of the sealing plate in contact with the positive electrode is formed with a metal layer made of aluminum or aluminum alloy.

Japanese Publication No. 09-274900 relates to a nonaqueous secondary battery with a structure that reportedly does not cause electrolyte leakage and reportedly provides an increase of battery resistance to impact applied.

Japanese Publication No. 10-340714 prevents breakage of an explosion proof valve body and reportedly develops this function by arranging the explosion proof valve body on the inside of a battery more than a terminal cap and connecting an electrode lead to the explosion-proof valve body through a welding plate.

Japanese Publication No. 2007-141673 provides a bobbin-type lithium primary battery whose cost can be reduced by using a nickel-plated steel plate as the material for a positive electrode can that can be reportedly used and preserved for a long period.

In view of the disclosures above, it would be desirable to provide an electrochemical cell having a closure assembly having an end assembly that exhibits desirable barrier properties to vapor transmission while still allowing emergency venting as necessary via a vent member.

SUMMARY OF THE INVENTION

In view of the above, it is an object of the present invention to provide an electrochemical cell having a closure assembly comprising a container with an open end sealed by an end assembly that forms an effective barrier to electrolyte vapor transmission and hence, mass loss.

A further object of the invention is to provide an electrochemical cell having a container having an open end closed by an end assembly, wherein the container imparts axial and radial forces on the end assembly to provide leakage suppression. In a preferred embodiment, the container is cylindrical and has a circumferential bead in the sidewall that protrudes inwardly and upwardly towards the container opening, with the bead upper and lower walls maintained in a spaced apart relationship to allow for the container to be axially compressed between the upper inwardly crimped end of the container and the upper wall of the bead with a portion of the end assembly located therebetween.

A further object of the present invention is to provide an electrochemical cell having a closure assembly which provides for increased path length for vapor transmission, wherein the path length is increased in one embodiment by providing the container with a bead having a relatively deep inwardly projecting depth. The bead configuration can be accompanied by a seal member having a relatively small thickness between the bead and a component of the end assembly to minimize the cross section area of a potential electrolyte vapor outlet.

A further object of the present invention is to provide an electrochemical cell having an end assembly comprising a vent member capable of venting at a predetermined internal pressure, wherein the vent member is resistant to electrolyte vapor transmission and can be, for example, a foil vent or a ball vent.

Yet a further object of the present invention is to provide an electrochemical cell having a closure assembly comprising a container and an end assembly comprising a seal member that electrically isolates the sidewall from at least electrically conductive components of the end assembly having a polarity different than the container, wherein the end assembly includes an internal contact member, preferably having spring-like characteristics, connected to a pressure release vent member, with the contact member having a peripheral flange that acts in combination with a seal member and a container sidewall to provide both axial and radial sealing to the cell to reduce vapor transmission.

Still another object of the present invention is to provide a cell having a closure assembly including a contact member having a peripheral flange that includes two separated axial segments that aid in providing radial compression between the contact member and a container sidewall, with a seal member disposed therebetween.

An additional object of the present invention is to provide an electrochemical cell having a closure assembly that aids in shielding an insulating, polymeric seal member of the closure assembly from electrolyte, wherein the closure assembly includes a contact member electrically connected to an inner cover, and further including an insulating member located between and in contact with an internal portion of a bead of the container and the contact member, with the insulating member further functioning to prevent contact between a current collector of an electrode of the cell and the container which has a different polarity than the current collector.

Another object of the present invention is to provide a method for forming an electrochemical cell, particularly including a container for an electrochemical cell, comprising forming an elongated and upwardly tapered bead upper wall in the container sidewall in order to provide enhanced axial and radial sealing forces, which seeks to minimize mass loss due to leakage of electrolyte vapor.

In one aspect of the invention, an electrochemical cell is disclosed, comprising a cylindrical metal container having a closed bottom end, a sidewall and an open end, a spirally wound electrode assembly disposed within the container, said electrode assembly comprising a positive electrode, a negative electrode consisting essentially of lithium or a lithium alloy, a separator disposed between the positive and negative electrodes, and a non-aqueous volatile electrolyte, a circumferential inward projection in the sidewall and having an upper wall and a lower wall connected by a transition member, the upper wall inclined upwardly towards a radial center of the cell, and the upper wall spaced apart from the lower wall along their respective lengths, and an end assembly closing the open end of the container, the end assembly comprising a vent member capable of venting at a predetermined internal pressure, a current limiting or interrupting member, and an insulating, polymeric seal member located between the container and a conductive contact of the end assembly, and wherein the conductive contact is operatively electrically connected to the positive electrode or negative electrode.

In a further aspect of the present invention, a method for forming an electrochemical cell is disclosed, comprising the steps of providing a cylindrical container having a closed bottom end, a sidewall and an open end, forming an initial bead in the sidewall of the container after insertion of an electrode assembly into the container, wherein the initial bead is located at a cell axial height above the electrode assembly, inserting an end assembly into the container so that a peripheral portion of the end assembly is seated on an upper wall of the initial bead, providing support to a) the bottom end of the container, b) the initial bead with a bead support, and c) the opened end of the container and tapering the upper wall upward towards the radial center of the cell, and crimping the open end of the container sidewall and securing the end assembly between the crimped end and a portion of the upwardly tapered upper wall to form a sealed cell, wherein the bead upwardly tapered upper wall is spaced from a lower wall of the bead in the sealed cell.

In still another aspect of the present invention, an electrochemical cell is disclosed, comprising a cylindrical conductive container having a closed end, an open end sealed by an end assembly, and a sidewall extending between the closed end and the open end, the conductive container being of a first polarity and the end assembly having a contact assembly of a second polarity, said sidewall having an inwardly extending bead, an electrode assembly comprising a positive electrode, a negative electrode and a separator disposed between the electrodes, and an electrolyte, wherein one of the electrodes is in operative electrical contact with the container and the other electrode is in operative electrical contact with the contact assembly of the end assembly, and the end assembly comprising a seal member that electrically isolates the sidewall from electrically conductive components of the end assembly having the second polarity, wherein the contact assembly includes a conductive contact member having a peripheral flange connected to a pressure release vent member, the pressure release vent member capable of rupturing in response to internal cell pressure that is at least as high as a predetermined release pressure thereby allowing matter to escape through the vent member, wherein the peripheral flange includes an axial segment that extends an axial distance substantially parallel to a segment of the sidewall adjacent thereto, wherein the peripheral flange includes a radial segment extending from the axial segment in a substantially radial direction and includes a portion located axially above the bead, wherein the peripheral flange transitions from the radial segment to a second lower axial segment extending in a substantially axial direction, and wherein the seal member is under compression between at least (a) the sidewall and peripheral flange axial segment, (b) the bead and the radial segment, and (c) the bead and the second lower axial segment.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
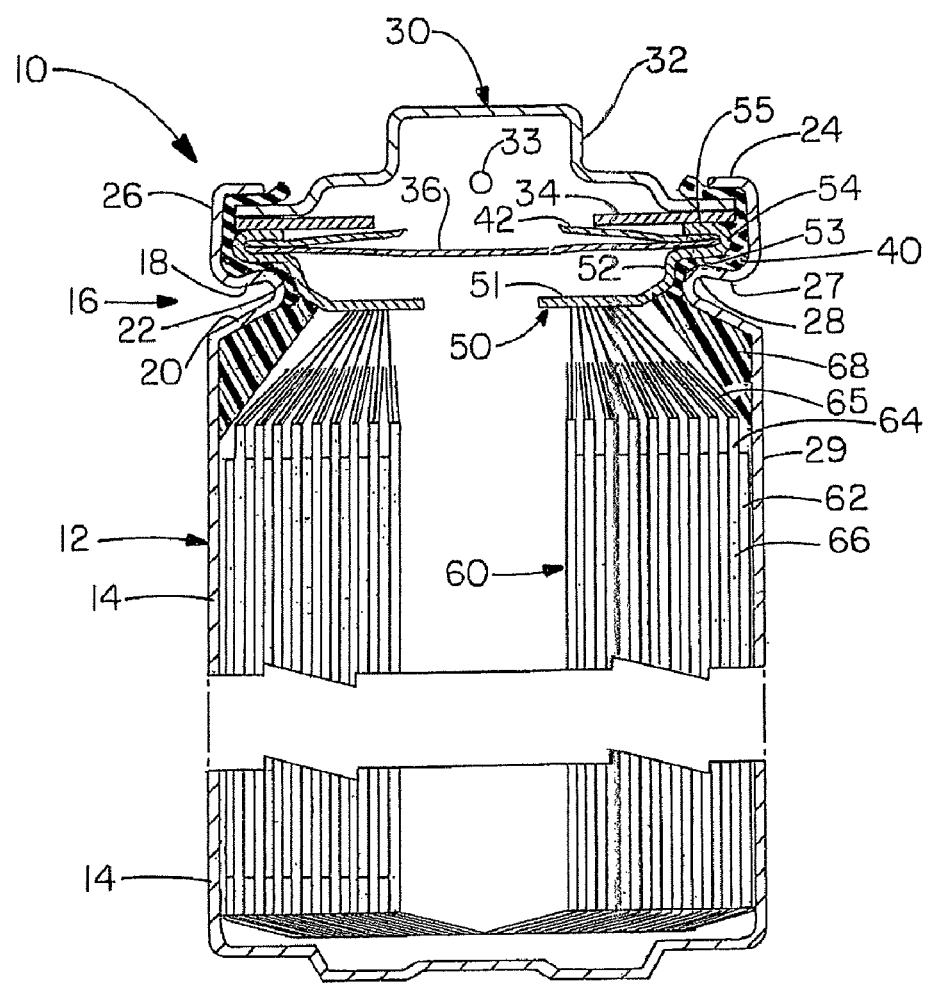
FIG. 1 is a partial cross-sectional elevational view of one embodiment of an electrochemical cell of the present invention.

The invention relates to electrochemical cells, preferably containing lithium or lithium alloy as an electrochemically active material and a non-aqueous electrolyte, with a cell closure assembly including a cylindrical container having an open end sealed by an end assembly including a pressure release vent member capable of venting when the internal pressure of the cell is at or above a predetermined pressure. The invention will be better understood with reference to the drawings, wherein FIG. 1 illustrates one embodiment of a cylindrical electrochemical cell 10 of the present invention. Cell 10 is a primary FR6-type cylindrical Li/FeS$_2$ cell. However, it is to be understood that, as described herein, the invention is applicable to other cell types, materials and constructions.

Cell 10 has a housing 12 that includes a container 14 in the form of a can with a closed bottom and an open top end. The open top end is closed with an end assembly 30 that cooperates with the open top end. The container 14 has a circumferential inward projection or bead 16 near the top end of the container that supports a portion of the end assembly 30. Bead 16 is generally considered to separate the top and bottom portions of the container 14. The closure assembly including container 14 and end assembly 30 seals an electrode assembly 60 within the bottom portion of the container 14. The electrode assembly 60 includes an anode or negative electrode 62, a cathode or positive electrode 64 and a separator 66 disposed between the negative electrode 62 and the positive electrode 64. Electrolyte is also disposed within the bottom portion of the container 14. In the illustration shown in FIG. 1, the negative electrode 62, positive electrode 64 and separator 66 are each relatively thin constructions which are wound together in a spiral, also known as a "jellyroll" configuration. Electrochemical cell 10, as illustrated, is cylindrical, however, one skilled in the art can appreciate that alternative embodiments of the present invention can also include cells and electrodes of other shapes. The container 14 can be one of several geometric shapes for open-ended containers, for example, prismatic and rectangular containers, provided that the teachings regarding the closure assembly are followed. As the sealing of an open-ended cylindrical cell presents challenges regarding the radial and axial forces required to create the seal, the end assembly 30 which cooperates with the container 14 to minimize vapor transmission is expected to have particular applicability to cylindrical containers.

Container 14 is preferably a metal can having an integral closed bottom. However, a metal tube that is initially open at both ends may be used in some embodiments. Container 14 in one embodiment is steel that is optionally plated, for example, with nickel on at least the outside to protect the exposed surface of the container from corrosion or to provide a desired appearance. In one embodiment the container is formed using a drawing process and can be made from a diffusion annealed, low carbon, aluminum killed, SAE 2006 or equivalent steel, with a grain size of ASTM 9 to 11 and equiaxed to slightly elongated grain shape. Other metals may be used in alternative embodiments, for example, when the open circuit voltage of the cell is designed to be greater than or about 3 volts, or the cell is rechargeable, in order to provide relatively greater corrosion-resistance. Examples of alternative container materials include, but are not limited, stainless steels, nickel plated stainless steels, nickel clad stainless steel, aluminum and alloys thereof.

Figure 2:
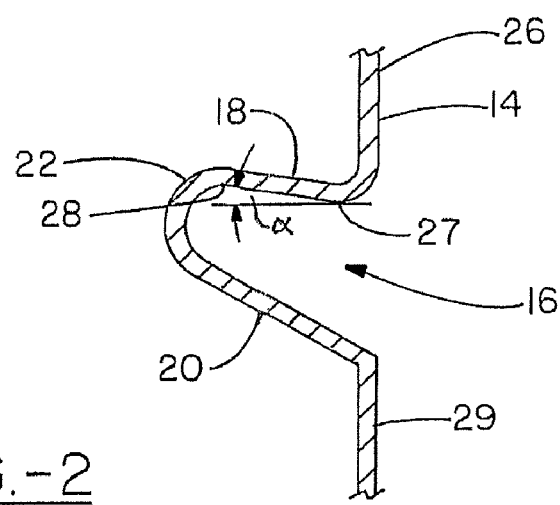
FIG. 2 is a cross-sectional elevational view of one embodiment of a portion of a container having an inward projection with an upper wall inclined upwardly.

As illustrated in FIGS. 1 and 2, bead 16 is an inward projection preferably extending circumferentially around the cylindrical container. Bead 16 has an upper wall 18, a lower wall 20 and transition member 22 which connects the upper wall 18 to lower wall 20. Upper wall 18 is inclined upwardly towards the radial center of the cell, and aids in providing a desired axial compression between the upper wall 18 of the bead 16 and the crimped end 24 of container 14. As shown in detail in FIG. 2, upper wall 18 includes a lowermost point 27 and an uppermost point 28 located radially closer to the center of cell 10 when compared to the lowermost point 27. In order to provide desired axial sealing forces, and aiming to minimize weight loss due to leakage, the upper wall 18 is provided with a preferred angle of taper. More specifically as illustrated in FIG. 2, an angle, $\alpha$, exists between an imaginary horizontal line, i.e., perpendicular to the axial direction of the cell, extending through upper wall lowermost point 27 and an imaginary line drawn between upper wall lowermost point 27 and upper wall uppermost point 28 which is at least 1°, generally from about 1° or about 2° to about 30° and preferably from about 3° or about 5° to about 20°. The actual contour of the upper wall surface located between lowermost point 27 and uppermost point 28 can vary, and for example, can be curved or linear. Likewise, as illustrated in FIG. 1, the cell lower wall 20 may also include an upwardly slanted taper extending in a direction toward the radial center of the cell. Transition member 22 is preferably rounded or curved and maintains a desired spacing between upper wall 18 and lower wall 20. The space between the upper wall 18 and the lower wall 20 allows insertion and removal of a support tool utilized during the closing process.

Bead 16 has a relatively deep depth, providing an increased path length for electrolyte vapor migration, thereby slowing vapor migration. The relatively deep bead depth also provides a desirable radial sealing force to the cell 10. Bead depth as defined herein is measured on the exterior of container 14 as the horizontal or radial distance between the greatest radially inwardly extending external surface portion of transition member 22 and a point located on an imaginary line extended vertically or axially from the maximum radius of upper sidewall 26. Lower sidewall 29 is situated below bead 16 as illustrated in FIG. 1. The bead is preferably formed in the container sidewall after the electrode assembly has been placed in the lower portion of the container.

In preferred embodiments, the bead depth preferably is greater than 1.5 mm for a R6 size cell, greater than 1.1 mm for a R03 type cell. Stated differently, the bead depth is at least 22%, desirably at least 26% and preferably 30% of the maximum radius of the cell container 14 for R6 or R03 size cells or other cell sizes.

The end assembly 30 is disposed in the top portion of container 14 and includes a conductive contact terminal 32, optionally, a current limiting or interrupting member 34, a pressure release vent member 36, a seal member 40 and a contact spring or member 50 defining an opening. The end assembly 30 optionally includes a retainer 42 defining an opening. The insulating, polymeric seal member 40 is disposed between at least the components of the end assembly 30 having a polarity different than the polarity of container 14 that might otherwise make contact therewith. The current limiting or interrupting member 34, when present, is disposed in an electrical path between the conductive contact terminal 32 and the positive electrode 64 of electrode assembly 60. The conductive contact terminal 32 preferably protrudes above the end of container 14 and is held in place by the inwardly crimped end 24 of container 14 with seal member 40 disposed therebetween and preventing electrical contact between the two components. Conductive contact terminal 32 can be provided with one or more vent apertures 33 for allowing release of fluid if vent member 36 is breached. Retainer 42 is illustrated as a washer including an aperture through which fluids can also pass if vent member 36 is breached or ruptured. Contact member 50 is operatively electrically connected to the conductive contact terminal 32 either directly or indirectly such as shown through the current limiting or interrupting member 34.

Contact member 50 has a shape that cooperates with seal member 40 and container bead 16 and upper sidewall 26 in order to provide for a desired seal to minimize vapor transmission. The positive electrode 64 of electrode assembly 60 is electrically connected to the contact member 50 directly or indirectly through a lead. Contact member 50 preferably has at least one tab 51 in contact with an upper end of a current collector 65 of the positive electrode that is disposed at the top of the electrode assembly 60. Current collector 65 of the positive electrode 64 is an electrically conductive substrate, for example a metal substrate, on which the positive electrode materials are disposed, and extends beyond the positive electrode materials and the separator 66. Current collector 65 may be made from any suitable material, for example copper, aluminum, or other metals or alloys of the above so long as they are substantially stable inside the cell and compatible with the materials utilized therein. Current collector 65 can be in the form of a thin sheet, foil, a screen or expanded metal in preferred embodiments.

Contact member 50 can be made of one or more conductive materials, preferably having spring-like characteristics, for example, shape memory alloys or bimetallic materials, although any component which makes and maintains a sufficient electrical contact with the desired components can be utilized.

When the end assembly 30 is placed into container 14 during assembly, the current collector 65 is biased against tab 51 of contact member 50 which, as indicated above, is resilient and/or resistant to force. The characteristics of tab 51 aid in maintaining contact between contact member 50 and current collector 65. Optionally, the tab 51 can be welded to the current collector 65 or connected via an electrically conductive lead, such as a narrow metal strip or wire that can be welded to both the tab 51 and current collector 65. Welded connections can sometimes be more reliable, especially under relatively harsh handling, storage and use conditions, but pressure connections do not require additional assembly operations and equipment.

Contact member 50 has a peripheral flange connected to tab 51 configured complimentary to the shape of the adjacent container sidewall with a goal of minimizing vapor transmission. Contact member 50 has an axial segment 52 connected to tab 51, a radial segment 53 extending radially outward from axial segment 52 and a further axial segment 54 located radially outwardly from radial segment 53 that transitions into an inwardly folded end 55. The lower axial segment 52 extends below the uppermost point 28 of wall 18 of bead 16 to provide for a desired compression force between axial segment 52 and bead 16. The two axial segments 52 and 54 are separated by radial segment 53 and are disposed at different radial distances from each other with axial segment 52 being located closer to the radial center of the cell when compared to axial segment 54. It is to be understood that axial segments 52 and 54 and radial segment 53 may not be completely linear and can have variations in form along their respective lengths. The noted axial and radial segments, namely 52, 54 and 53, may vary along their length from the respective axial or radial directions at an angle up to about 45° from vertical with respect to the axial segments and horizontal with respect to the radial segments.

The configuration of the contact member axial and radial segments allows seal member 40 to be compressed between a) the container upper sidewall 26 and the peripheral flange axial segment 54, b) a portion of the bead upper wall 18 and radial segment 53, and c) the bead 16 and axial segment 52. The multiple radial and axial compression areas between the container and the contact member with the seal member disposed therebetween are designed to reduce the ability of electrolyte vapor to escape from the cell. The design of the contact member is one factor in allowing the thickness of the seal member to be reduced, thereby minimizing the average of cross-section area for vapor transmission through the seal member. The configuration also provides for a relatively long pathway through which the electrolyte vapor must travel in order to escape from the cell. The contact member provides radial and axial structural strength to withstand radial and axial sealing forces. In some embodiments, the contact member participates in sealing the vent member.

Seal member 40 provides a seal between other components of end assembly 30 and sidewall container 14. In one embodiment, the seal member extends from below the upper wall 18 of the bead 16, preferably at least from adjacent or below the transition member 22 and generally adjacent to an insulating member 68 which physically separates a portion of the current collector 65 from the sidewall of the container below the bead 16, and up to or past the crimped end 24 of the top portion of container 14. Bead 16 provides a seating surface for the end assembly 30. Seal member 40, as indicated above, physically separates at least the conductive components of the end assembly from the container 14 and also seals the peripheral edges of the components of the end assembly 30 to prevent corrosion and leakage of electrolyte between these components. Seal member 40 is sized so that upon inserting the closure assembly into the container 14 and closing or crimping the top end of the container, the seal member is compressed to create a seal between the seal member and container 14 as well as between the seal member 40 and the interfacial surfaces of the other adjacent components of the end assembly 30. Initial wall thickness of the seal member can be different in one or more locations along the path length thereof. In one embodiment, seal member average thickness after reduction by the closing process is less than 0.55 mm for a R6 size cell and less than 0.37 mm for R03 and R8 size cells. In a preferred embodiment, seal member 40 undergoes at least a 10% reduction in at least one cross-sectional area upon closure of the cell, which is generally sufficient to absorb any variations in part dimensions and maintain compression under a range of conditions the cell is subjected to.

A goal of the present invention is to minimize the surface area of the seal member exposed to the electrolyte as weight loss in some embodiments can be attributed to diffusion through seal members at relatively high temperatures. The seal member 40 is also made of a material composition that can form a compression seal with other cell components and it also has low vapor transmission rates in order to minimize, for example, the entry of water into the cell and loss of electrolyte from the electrochemical cell. The seal member 40 can include a polymeric composition, for example, a thermoplastic or thermoset polymer, the composition of which is based in part upon factors such as chemical compatibility with the components of the electrode assembly, namely the negative electrode 62, positive electrode 64, as well as the electrolyte, such as a non-aqueous electrolyte used in the electrochemical cell 10. The seal member is made from any suitable material that provides the desired sealing and insulating properties. Examples of suitable materials include, but are not limited to, polypropylene, polyphenylene sulfide, tetrafluorideperfluoroalkyl vinyl ether copolymer, polybutylene terephthalate, ethylene tetrafluoroethylene, polyphthalamide, or any combination thereof. Preferred gasket materials include polypropylene (e.g., PRO-FAXT 6524 from Basell Polyolefins, Wilmington, Del., USA), polybutylene terephthalate (e.g., CELANEX® PBT, grade 1600A from Ticona-U.S., Summit, N.J., USA) and polyphenylene sulfide (e.g., TECHTRON® PPS from Boedeker Plastics, Inc., Shiner, Tex., USA), and polyphthalamide (e.g., Amodel® ET 1001 L from Solvay Advanced Polymers of Alpharetta, Ga., USA). The seal member compositions can optionally contain reinforcing fillers such as inorganic fillers and/or organic compounds.

The seal member 40 may be coated with a sealant to further enhance sealing properties. Ethylene propylene diene terpolymer (EPDM) is a suitable sealant material, but other suitable materials can be used.

As evident from FIG. 1, the contact member 50 is designed such that it seals a relatively large percentage of surface area of the seal member 40 that otherwise would be exposed to the electrolyte within the cell. The seal member thickness is small in order to provide a relatively small cross-section area for vapor transmission, thereby minimizing the same.

The seal members of the invention can have a number of different configurations in order to aid in meeting the goal of containing vapors within the cell. The seal member illustrated in FIG. 1 is formed as a hollow cylinder or annulus having various radial dimensions along its axial length. After closing, the seal member has an upper radial segment substantially extending in a radial direction, situated below crimped end 24 of container 14. At least a portion of the upper radial segment is under axial compression as it is located between the bead 16 and crimped end 24 which are axially compressed during the cell closing or sealing process. The upper radial segment transitions into an upper axial segment substantially extending in an axial direction adjacent to the container upper sidewall 26. The upper axial segment generally extends between the crimped end 24 and the upper wall 18 of the bead 16. The peripheral portions of the contact terminal 32, the current limiting or interrupting member 34 and the contact member 50 are adjacent the upper axial segment, which is under radial compression between the same and the upper sidewall 26. The seal member transitions to a lower radial segment extending in a substantially radial direction along the upper wall 18 of bead 16. The lower radial segment has a portion that is also under axial compression, being located between the upper wall 26 and the crimped end 24. The seal member 40 also has a lower axial segment extending in a substantially axial direction from the inner end of the lower radial segment. The lower axial segment has a portion that is radially compressed between the transition member 22 of bead 16 and the axial segment 52 of contact member 50. As illustrated, the seal member lower axial segment is located closer to the radial center of the cell compared to the upper axial segment.

As indicated herein, in some embodiments a major source of weight loss during a temperature cycling test, such as a T2 test, can be electrolyte vapor transmission through the seal member. According to a T2 test procedure, test cells and batteries are stored, after determining their initial weight, for at least six hours at a test temperature equal to 75±2° C., followed by storage for at least six hours at a test temperature equal to −40±2° C. The maximum time interval between test temperature extremes is 30 minutes. This procedure is repeated 10 times, after which all test cells and batteries are stored for 24 hours at ambient temperature (20±5° C.) and subsequently reweighed. The weight loss is the difference between the initial weight and the post-test weight. Weight loss by diffusion through the seal member can be calculated by multiplying the vapor transmission rate by dimensional ratio of the seal member and time. Diffusion weight loss can be reduced by one or more of reducing the dimensional ratio and the vapor transmission rate. In order to reduce weight loss, the dimensional ratio can be decreased by reducing cross section area or increasing path length, or a combination thereof.

For a uniform material positioned over an open end of a container filled with electrolyte, the dimensional ratio can be calculated easily. Here the cross-sectional area is the surface area of the membrane that is exposed to the electrolyte vapor and the path length is the membrane thickness. Due to the irregular shape of seal members, calculations of the dimensional ratios are more difficult. When utilized in the present invention, finite element diffusion analysis is utilized to calculate the dimensional ratio. In the finite element diffusion analysis, the flux integrated across a cross section bonded by sealed surfaces is the dimensional ratio if the diffusion coefficient in the seal member and vapor concentration at the seal member internal surface that is exposed to electrolyte are assumed to be unit and the vapor concentration at the seal member external surface that is exposed to the ambient is assumed to be zero. It is also assumed that the interface between a current limiting or interrupting member and contact member or inner cover is not sealed and, therefore, the vapor concentration at the seal member surface adjacent to the interface is assumed to be zero. Samples of commercially available software that can be utilized to perform diffusion analysis modeling include MSC.MARC 2005r3 available from MSC. Software, Los Angeles, Calif. and ABAQUS available from SIMULIA, Providence, R.I. MSC.MARC was utilized to calculate the dimensional ratios presented herein. For a R6-size cell as illustrated in FIG. 1, the calculated dimensional ratio is 0.279 cm (0.110 in.). For a R6 size lithium-iron disulfide cell constructed as disclosed in FIG. 1, the dimensional ratio of the seal member is generally less than 1.14 cm (0.45 in.), desirably less than 0.86 cm (0.34 in.) and preferably less than 0.51 cm (0.20 in.) Likewise, for R03 and R8 (AAAA) size cells, dimensional ratios of the seal members are generally less than 0.86 cm (0.34 in.), desirably less than 0.48 cm (0.19 in.) and preferably less than 0.30 cm (0.12 in.).

In a preferred embodiment of the present invention, the closing process for forming a finished cell reduces the seal member wall thickness in various areas. In a preferred embodiment, the smallest cross section of the gasket is located near the base of the gasket adjacent the inlet of the vapor path, for example, the portion of the seal member located between axial segment 52 of contact member 50 and transition member 22 of bead 16. The cross-sectional area between the contact member and the bead is less than 12.5 mm$^2$ for a R6-size cell and less than 6.3 mm$^2$ for R03 size cells in preferred embodiments. That said, the axial segment 52 of contact member 50 for a sealed R6-size cell is extended at least 0.25 mm axially below upper wall uppermost point 28 of the bead 16 in one embodiment, and preferably below the transition member 22 segment of the bead.

In the embodiment illustrated in FIG. 1, the vent member 36 is disposed in the opening defined by the peripheral flange of the contact member 50. More specifically, the vent member 36 periphery is secured between axial segment 53 and folded end 55 of the peripheral flange of contact member 50. In the embodiment illustrated, retainer 42 is also secured between axial segment 53 and folded end 55 of contact member 50. The seal between the vent member 36 and contact member 50 can be the result of tight pressure contact at the interfacial surfaces, which can, in some embodiments, be enhanced by compression of the peripheral portion of the vent member 36. Optionally, an adhesive or sealant can be applied to the desired interfacial surfaces to connect the vent member 36 to contact member 50 and thereby form a desired seal. Axial forces generated during crimping or closing of the container 14 during assembly are also placed on the peripheral portions of the components of the end assembly 30 including the vent member 36 as illustrated in FIG. 1.

Gases are generated within the cell due to environmental conditions such as temperature and, in certain instances, generated during normal operation through chemical reactions. The cell contents are substantially contained within the electrochemical cell by the pressure release vent member below a predetermined pressure. The pressure release vent member 36 periphery is compressed a sufficient amount to prevent the pressure release vent member from creeping inwardly so as to form an aperture in the opening defined by the contact member 50 when the cell internal pressure is less than the predetermined release pressure. When the pressure within the electrochemical cell is at least as high as a predetermined release pressure, the vent member 36 ruptures and allows fluid, in the form of liquid or gas or a combination thereof, within the cell to escape through the opening in the vent member 36. The fluid within the cell can escape through the one or more vent apertures 33 in the conductive contact terminal 32. The predetermined release pressure can vary according to the chemical composition of the cell. The predetermined pressure is preferably above a pressure which will avoid false vents due to normal handling and usage or exposure to the ambient atmosphere. For example, in an FR6-type lithium-containing electrochemical cell, the predetermined release pressure, for example the pressure at which the vent member 36 creates an opening, for example, via rupturing, can range from about 10.5 kg/cm$^2$ (150 lbs/in$^2$) to about 112.6 kg/cm$^2$ (1600 lbs/in$^2$) and in some embodiments, from about 14.1 kg/cm$^2$ (200 lbs/in$^2$) to about 56.3 kg/cm$^2$ (800 lbs/in$^2$) at room temperature, about 21° C. The pressure at which the pressure release vent member 36 ruptures can be determined by pressurizing a cell, e.g., through a hole punctured in the container.

As described hereinabove, the electrochemical cell 10 of the present invention can optionally include a current limiting or interrupting member 34 which is disposed in the electrical path between the current collector 65 of the positive electrode 64 and the conductive contact terminal 32. The current limiting or interrupting member 34 can slow or prevent the continued cell internal heating and pressure build-up and/or prevent current flow, which conditions can result from electrical abuses such as internal short circuiting, abnormal charging and forced deep discharging. However, if the internal pressure builds to the predetermined release pressure, the pressure release vent member 36 ruptures to relieve the internal pressure. The current limiting or interrupting member can be, for example a positive temperature coefficient (PTC) device or for example a thermal current interrupting switch, such as described in U.S. Ser. No. 11/787,436, herein fully incorporated by reference.

As indicated hereinabove, the vent member 36 can be for example, a foil vent or a ball vent.

Figure 3:
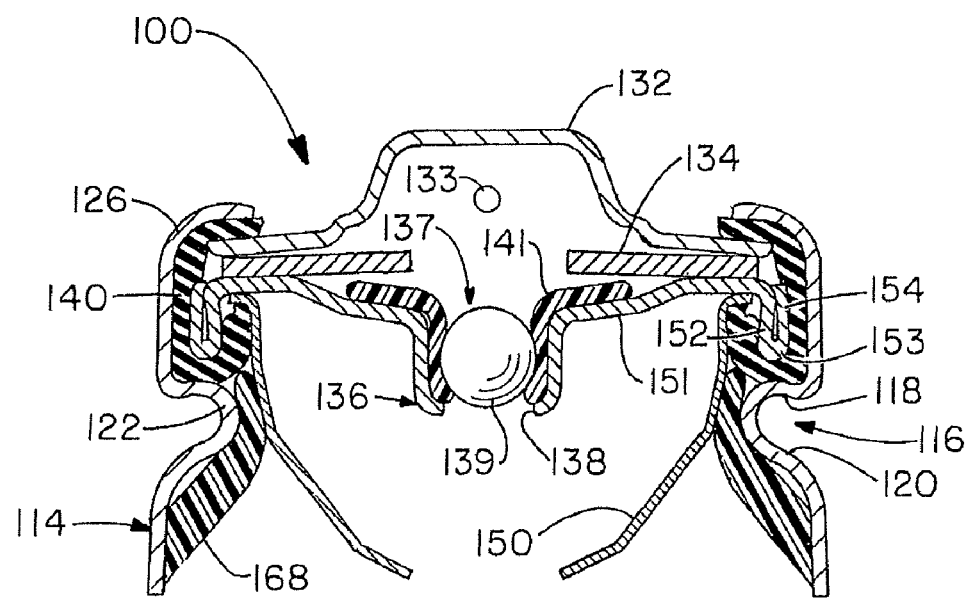
FIG. 3 is a cross-sectional elevational view of a further embodiment of a closure assembly of an electrochemical cell of the present invention.

A further embodiment of an electrochemical cell 100 of the present invention is illustrated in FIG. 3. Cell 100 includes an end assembly including a pressure relief vent member 136 and a contact member assembly including a conductive inner cover 151 having a vent well 137 that projects downwardly away from the positive contact terminal 132, internal to the electrochemical cell 100. In one embodiment, the inner cover is formed from a material as described for the contact member. The vent well 137 has a vent aperture 138 formed therein which is sealed by the vent ball 139 and vent bushing 141 when they are seated in vent well 137 such that the bushing 141 is compressed between the vent ball 139 and the vertical wall of the vent well 137. In one embodiment, the vent bushing 141 is a thermoplastic. When the internal pressure of the electrochemical battery cell 100 exceeds a predetermined level, the vent ball 139 and in some cases both the bushing 141 and the vent ball 139 are forced away from the vent aperture 138 and at least partly out of the vent well 137 to release pressurized fluid through the vent aperture 133 of cell 100. The cell illustrated in FIG. 3 further includes a conductive tab contact member 150 electrically connected to inner cover 151. Inner cover has a U-shaped peripheral wall having an inner axial segment 152 and an outer axial segment 154 of substantially the same height, i.e., having a difference of generally less than 20%, and preferably less than 10%, both extending in a substantially axial direction of the cell 100. The axial segments 152 and 154 are connected in this embodiment by a radially extending segment 153. The configuration of inner cover 151 aids in forming an electrolyte migration barrier in combination with seal member 140 and container upper sidewall 126. As the radially extending segment 153 of inner cover 151 is located above bead 116 with seal member 140 having a portion located therebetween, during closing of the cell, the seal member 140 is axially compressed between bead 116 and inner cover 151. Moreover, the axially extending segments 152 and 154 aid in providing radial compression of seal member 140 in conjunction with the adjacent sidewall 126 of the container as seal member 140 also includes a portion located between axial segment 154 and sidewall 126. Cell 100 further includes a current limiting or interrupting member 134 disposed between inner rollback cover 151 and contact terminal 132. Furthermore, the cell illustrated in FIG. 3 includes an inwardly projecting bead 116 having an upper wall 118 inclined upwardly towards the radial center of the cell, as described hereinbelow with respect to FIG. 1, and further includes transition segment 122 and lower wall 120.

The seal member 140 illustrated in FIG. 3 is formed as an annulus having a "C"-shaped vertical cross section. After closing, the seal member has an upper radial segment substantially extending in a radial direction, situated below crimped end of upper sidewall 126 of container 114. At least a portion of the upper radial segment is under axial compression as it is located between the bead 116 and the crimped end which are axially compressed during the cell closing or sealing process. The upper radial segment transitions into an outer axial segment substantially extending in an axial direction adjacent to the container upper sidewall 126. The outer axial segment generally extends between the crimped end and the upper wall 118 of the bead 116. The peripheral portions of the contact terminal 132, the current limiting or interrupting member 134 and the inner cover 151 are adjacent the outer axial segment, which is under radial compression between the same and the upper sidewall 126. The seal member outer axial segment transitions to a lower radial segment extending in a substantially radial direction along the upper wall 118 of bead 116. The lower radial segment has a portion that is also under axial compression, being located between the upper wall 118 and the crimped end of sidewall 126. The seal member transitions upwardly from the lower radial segment into an inner axial segment that extends a distance upwardly between the inner axial segment 152 of inner cover 151 and the contact member 150.

In order to provide an additional hindrance to electrolyte migration through seal member 140, seal member 140 is shielded from the internal portion of the cell containing the electrode assembly and electrolyte by the inner cover 151, contact member 150 and insulating member 168. Insulating member 168 has a dual purpose of providing a portion of a barrier to electrolyte migration as indicated, as well as to prevent the current collector of the electrode electrically connected to contact terminal 132 from contacting the sidewall of container 114. In a preferred embodiment as illustrated, a portion of insulating member 168 is disposed between and in contact with both bead 116 and contact member 150, thereby forming an additional seal to impede or slow electrolyte migration.

Figure 4:
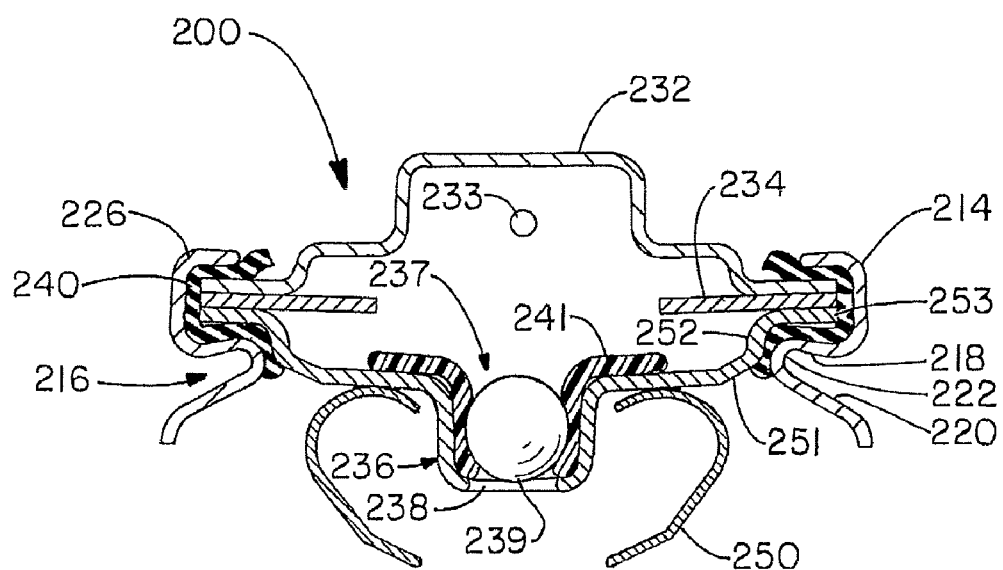
FIG. 4 is a cross-sectional elevational view of still another embodiment of a closure assembly of an electrochemical cell of the present invention.

A further embodiment of an electrochemical cell having a ball vent is illustrated in FIG. 4. While FIG. 4 shows an upper portion of cell 200, a lower portion of the cell can be similar to that shown in FIG. 1. Cell 200 includes a pressure relief vent member 236, a ball vent. Cell 200 includes a conductive contact member assembly including an inner cover 251 having a vent well 237 that projects downwardly away from positive contact terminal 232. Vent well 237 has a vent aperture 238 formed therein which is sealed by vent ball 239 and vent bushing 241, when they are seated in vent well 237 such that the bushing 241 is compressed between the vent ball 239 and the vertical wall of vent well 237. As indicated hereinabove, when the internal pressure of the cell 200 exceeds a predetermined level, the pressure relief vent member 236 allows venting through vent aperture 238 and further through vent aperture 233 of the contact terminal 232. The cell further includes a current limiting or interrupting member 234.

Cell 200 further includes a tab-type contact member 250 electrically connected to inner cover 251 for contact with the current collector of the positive electrode. Inner cover 251 has a peripheral flange located radially outward from the portion of the inner cover 251 that forms vent well 237. The peripheral flange cooperates with seal member 240 and container 214 to provide an electrolyte migration barrier and adequate cell seal. Seal member 240 has a configuration similar to seal member 40 shown in FIG. 1 and described herein above. The peripheral flange includes a radially extending segment 253 and axially extending segment 252. Seal member 240 is radially compressed between a portion of axial segment 252 and the bead 216, specifically transition segment 222 of bead 216 as well as between the end of radial segment 253 and upper sidewall 226 of the container 214. A zone of axial compression of seal member 240 is formed between the upper wall 218 of bead 216 and the radial segment 253 of inner cover 251. The bead 216 of cell 200, as illustrated, is an inwardly projecting bead having upper wall 218 inclined upwardly towards the radial center of the cell as described herein with respect to FIG. 1. Upper wall 218 is spaced from lower wall 220 in order to impart desired axial compression to the closure assembly of cell 200.

The vent bushing is made from a thermoplastic material that is resistant to cold flow at high temperatures (e.g., 75° C.). The thermoplastic material comprises a base resin such as ethylene-tetrafluoroethylene, polybutylene terephthlate, polyphenylene sulfide, polyphthalamide, ethylene-chlorotrifluoroethylene, chlorotrifluoroethylene, perfluoroalkoxy-alkane, fluorinated perfluoroethylene polypropylene and polyetherether ketone. Ethylene-tetrafluoroethylene copolymer (ETFE), polyphenylene sulfide (PPS), polybutylene terephthalate (PBT) and polyphthalamide are preferred. The resin can be modified by adding a thermal-stabilizing filler to provide a vent bushing with the desired sealing and venting characteristics at high temperatures. The bushing can be injection molded from the thermoplastic material. TEFZEL® HT2004 (ETFE resin with 25 weight percent chopped glass filler) is a preferred thermoplastic material.

The vent ball can be made from any suitable material that is stable in contact with the cell contents and provides the desired cell sealing and venting characteristic. Glasses or metals, such as stainless steel, can be used.

The pressure release vent member 36, which in the embodiment shown in FIG. 1, is a foil-type vent, disposed between the retainer 42 and the contact member 50 includes at least one layer of a composition of metal, polymer, or mixtures thereof. It is also possible that the pressure release vent member 36 can include two or more layers of different material compositions. For example, a second layer having a different composition than a first layer may be used for purposes of bonding the pressure release vent member 36 to the retainer 42 or to the contact member 50. In another example, a second and a third layer having a different composition than the first layer may be used to bond the pressure release vent member 36 to both the retainer 42 and the contact member 50. Also, multiple layers having two or more compositions can be used for tailoring the performance properties, for example, strength and flexibility, of the pressure release vent member 36. Ideally, separate layers would be provided on the basis of compatibility with the electrolyte, ability to prevent vapor transmission and/or ability to improve the sealing characteristics of the vent member 36 within the end assembly. For example, an adhesive activated by pressure, ultrasound and/or heat, such as a polymer or any other known material in the adhesive field that is compatible with the elements disclosed herein, could be provided as a layer of the vent member 36 in order to bond the vent member within the end assembly.

Compositions suitable for use in the foil-type pressure release vent member 36 can include, but are not limited to, metals such as aluminum, copper, nickel, stainless steel and alloys thereof, and polymeric materials such as polyethylene, polypropylene, polybutylene terephthalate (PBT), polyethylene terephthalate (PET, ethylene acrylic acid, ethylene methacrylic acid, polyethylene methacrylic acid, and mixtures thereof. The composition of the pressure release vent member 36 can also include polymers reinforced with metal, as well as a single layer or a multi-layer laminate of metals or polymers or both. For example, the single layer can be a metal foil, preferably aluminum foil, that is substantially impermeable to water, carbon dioxide and electrolyte, or a non-metallized film of a polymer coated with a layer of oxidized material that prevents vapor transmission, such as, for example $SiO_x$ or $Al_2O_x$. The pressure release vent member 36 can furthermore contain an adhesive layer that contains a contact-bonding adhesive material, for example polyurethane, or a heat, pressure and/or ultrasonically activated material, for example low density polyolefins. Alternatively, these or other adhesives or sealant materials can be separately applied to a portion of the pressure release vent member (e.g., the outer periphery coming into contact with retainer 42 and/or spring 50), the retainer 42, the spring 50 or any combination thereof for enhancing the seal within the collector assembly. A preferred laminar vent construction would have four layers consisting of oriented polypropylene, polyethylene, aluminum foil and low density polyethylene.

Regardless of the composition, the pressure release vent member 36 should be chemically resistant to the electrolyte contained in the cell 10 and should have a low vapor transmission rate (VTR) to provide a low rate of weight loss for the cell 10 over a broad range of ambient temperatures. For example, if the pressure release vent member 36 is metal which is impervious to vapor transmission, the VTR through the thickness of the pressure release member 36 is substantially zero. However, the pressure release vent member 36 can include at least one layer of vapor-permeable material, for example polymeric materials, as described above, that can function, for example, as an adhesive or as an elastomeric layer to achieve a seal between the pressure release vent member 36 and at least one of the retainer 42 and the contact member 50.

The predetermined release pressure, or the pressure at which the pressure release vent member 36 is intended to rupture, is a function of its physical properties (e.g., strength), its physical dimensions (e.g., thickness) and the area of the opening defined by the retainer 42 and the opening defined by the PTC device, whichever is smaller. The greater the exposed area of the pressure release vent member 36, the lower the predetermined release pressure will be due to the greater collective force exerted by the internal gases of the electrochemical battery cell 10. Consequently, adjustments may be made to any of these variables in order to engineer an end assembly with a vent member without departing from the principles of the invention.

Depending upon the exposed area of the vent member 36 relative to the opening defined by the retainer 42, the thickness of the pressure release vent member can be less than about 0.254 mm (0.010 inch), and in some embodiments can range from about 0.0254 mm (0.001 inch) to about 0.127 mm (0.005 inch), and in yet other embodiments the thickness can range from about 0.0254 mm (0.001 inch) to about 0.05 mm (0.002 inch). The composition and thickness of the pressure release vent member 36 can be determined by those of ordinary skill in the art, in view of the vapor transmission rate (VTR) and predetermined release pressure requirements.

The pressure release vent member can include at least one layer of a composition containing metal, polymer, and mixtures thereof. A suitable three-layer laminate that can be used for the pressure release vent member is PET/aluminum/EAA copolymer available as LIQUIFLEX® Grade 05396 35C-501C from Curwood of Oshkosh, Wis., USA. A suitable four layer material of oriented PP/PE/aluminum/LDPE is FR-2175 from Ludlow Coated Products of Columbus, Ga., USA, which is a wholly-owned subsidiary of Tyco International, Ltd. of Princeton, N.J., USA. A suitable five-layer laminate is PET/PE/Aluminum/PE/LL-DPE available as BF-48 also from Ludlow Coated Products of Columbus, Ga., USA. However, as noted above, any combination of laminates for polypropylene, polyethylene, non-metallized polymeric films coated with a layer of oxidized material that prevents vapor transmission (for example, $SiO_x$ or $Al_2O_x$) and/or aluminum-based foils are also specifically contemplated.

The negative electrode comprises a strip of lithium metal, sometimes referred to as lithium foil. The composition of the lithium can vary, though for battery grade lithium the purity is always high. The lithium can be alloyed with other metals, such as aluminum, to provide the desired cell electrical performance. Battery grade lithium-aluminum foil containing 0.5 weight percent aluminum is available from Chemetall Foote Corp., Kings Mountain, N.C., USA.

The negative electrode may have a non-consumable current collector in some embodiments, within or on the surface of the metallic lithium. As in the cell in FIG. 1, a separate current collector may not be needed, since lithium has a high electrical conductivity, but a current collector may be included, e.g., to maintain electrical continuity within the negative electrode during discharge, as the lithium is consumed. When the negative electrode includes a non-consumable current collector, it may be made of copper because of its conductivity, but other conductive metals can be used as long as they are stable inside the cell.

In a preferred embodiment, the anode or negative electrode is free of a separate current collector and the one or more strips or foil of lithium metal or lithium-containing alloy solely serve as a current collector due to the relatively high conductivity of the lithium or lithium-containing alloy. By not utilizing a current collector, more space is available within the container for other components, such as active materials. Providing a cell without a negative electrode current collector can also reduce cell cost. Preferably a single layer or strip of lithium or a lithium-containing alloy is utilized as the negative electrode.

An electrical lead preferably connects the anode or negative electrode to the cell container. This may be accomplished embedding an end of the lead within a portion of the negative electrode or by simply pressing a portion such as an end of the lead onto the surface of the lithium foil. The lithium or lithium alloy has adhesive properties and generally at least a slight, sufficient pressure or contact between the lead and electrode will weld the components together. In one preferred embodiment, the negative electrode is provided with a lead prior to winding into a jelly-roll configuration. For example, during production, a band comprising at least one negative electrode consisting of a lithium or lithium alloy is provided at a lead connecting station whereat a lead is welded onto the surface of the electrode at a desired location. The tabbed electrode is subsequently processed so that the lead is coined, if desired, in order to shape the free end of the lead not connected to the electrode. Subsequently, the negative electrode is combined with the remaining desired components of the electrode assembly, such as the positive electrode and separator, and wound into a jelly-roll configuration. Preferably after the winding operation has been performed, the free negative electrode lead end is further processed, by bending into a desired configuration prior to insertion into the cell container.

The electrically conductive negative electrode lead has a sufficiently low resistance in order to allow sufficient transfer of electrical current through the lead and have minimal or no impact on service life of the cell. The desired resistance can be achieved by increasing the width and the thickness of the tab.

The positive electrode is generally in the form of a strip that comprises a current collector and a mixture that includes one or more electrochemically active materials, usually in particulate form. Iron disulfide ($FeS_2$) is a preferred active material. In a $Li/FeS_2$ cell the active material comprises greater than 50 weight percent $FeS_2$. The positive electrode can also contain one or more additional active materials, depending on the desired cell electrical and discharge characteristics. The additional active positive electrode material may be any suitable active positive electrode material. Examples include $Bi_2O_3$, $C_2F$, $CF_x$, $(CF)_n$, $CoS_2$, $CuO$, $CuS$, $FeS$, $FeCuS_2$, $MnO_2$, $Pb_2Bi_2O_5$ and S. More preferably, the active material for a $Li/FeS_2$ cell positive electrode comprises at least 95 weight percent $FeS_2$, yet more preferably at least 99 weight percent $FeS_2$, and most preferably $FeS_2$ is the sole active positive electrode material. $FeS_2$ having a purity level of at least 95 weight percent is available from Washington Mills, North Grafton, Mass., USA; Chemetall GmbH, Vienna, Austria; and Kyanite Mining Corp., Dillwyn, Va., USA.

In addition to the active material, the positive electrode mixture contains other materials. A binder is generally used to hold the particulate materials together and adhere the mixture to the current collector. One or more conductive materials such as metal, graphite and carbon black powders may be added to provide improved electrical conductivity to the mixture. The amount of conductive material used can be dependent upon factors such as the electrical conductivity of the active material and binder, the thickness of the mixture on the current collector and the current collector design. Small amounts of various additives may also be used to enhance positive electrode manufacturing and cell performance. The following are examples of active material mixture materials for $Li/FeS_2$ cell positive electrodes. Graphite: KS-6 and TIMREX® MX15 grades synthetic graphite from Timcal America, Westlake, Ohio, USA. Carbon black: Grade C55 acetylene black from Chevron Phillips Company LP, Houston, Tex., USA. Binder: ethylene/propylene copolymer (PEPP) made by Polymont Plastics Corp. (formerly Polysar, Inc.) and available from Harwick Standard Distribution Corp., Akron, Ohio, USA; non-ionic water soluble polyethylene oxide (PEO): POLYOX® from Dow Chemical Company, Midland, Mich., USA; and G1651 grade styrene-ethylene/butylenes-styrene (SEBS) block copolymer from Kraton Polymers, Houston, Tex. Additives: FLUO HT® micronized polytetrafluoroethylene (PTFE) manufactured by Micro Powders Inc., Tarrytown, N.Y., USA (commercially available from Dar-Tech Inc., Cleveland, Ohio, USA) and AEROSIL® 200 grade fumed silica from Degussa Corporation Pigment Group, Ridgefield, N.J.

The current collector may be disposed within or imbedded into the positive electrode surface, or the positive electrode mixture may be coated onto one or both sides of a thin metal strip. Aluminum is a commonly used material. The current collector may extend beyond the portion of the positive electrode containing the positive electrode mixture. This extending portion of the current collector can provide a convenient area for making contact with the electrical lead connected to the positive terminal. It is desirable to keep the volume of the extending portion of the current collector to a minimum to make as much of the internal volume of the cell available for active materials and electrolyte.

A preferred method of making $FeS_2$ positive electrodes is to roll coat a slurry of active material mixture materials in a highly volatile organic solvent (e.g., trichloroethylene) onto both sides of a sheet of aluminum foil, dry the coating to remove the solvent, calender the coated foil to compact the coating, slit the coated foil to the desired width and cut strips of the slit positive electrode material to the desired length. It is desirable to use positive electrode materials with small particle sizes to minimize the risk of puncturing the separator. For example, $FeS_2$ is preferably sieved through a 230 mesh (62 µm) screen before use.

The separator is a thin microporous membrane that is ion-permeable and electrically nonconductive. It is capable of holding at least some electrolyte within the pores of the separator. The separator is disposed between adjacent surfaces of the negative electrode and positive electrode to electrically insulate the electrodes from each other. Portions of the separator may also insulate other components in electrical contact with the cell terminals to prevent internal short circuits. Edges of the separator often extend beyond the edges of at least one electrode to insure that the negative electrode and positive electrode do not make electrical contact even if they are not perfectly aligned with each other. However, it is desirable to minimize the amount of separator extending beyond the electrodes.

To provide good high power discharge performance it is desirable that the separator have the characteristics (pores with a smallest dimension of at least 0.005 μm and a largest dimension of no more than 5 μm across, a porosity in the range of 30 to 70 percent, an area specific resistance of from 2 to 15 ohm-cm$^2$ and a tortuosity less than 2.5) disclosed in U.S. Pat. No. 5,290,414, issued Mar. 1, 1994, and hereby incorporated by reference.

Suitable separator materials should also be strong enough to withstand cell manufacturing processes as well as pressure that may be exerted on the separator during cell discharge without tears, splits, holes or other gaps developing that could result in an internal short circuit. To minimize the total separator volume in the cell, the separator should be as thin as possible, preferably less than 25 μm thick, and more preferably no more than 22 μm thick, such as 20 μm or 16 μm. A high tensile stress is desirable, preferably at least 800, more preferably at least 1000 kilograms of force per square centimeter (kgf/cm$^2$). For an FR6 type cell the preferred tensile stress is at least 1500 kgf/cm$^2$ in the machine direction and at least 1200 kgf/cm$^2$ in the transverse direction, and for a FR03 type cell the preferred tensile strengths in the machine and transverse directions are 1300 and 1000 kgf/cm$^2$, respectively. Preferably the average dielectric breakdown voltage will be at least 2000 volts, more preferably at least 2200 volts and most preferably at least 2400 volts. The preferred maximum effective pore size is from 0.08 μm to 0.40 μm, more preferably no greater than 0.20 μm. Preferably the BET specific surface area will be no greater than 40 m$^2$/g, more preferably at least 15 m$^2$/g and most preferably at least 25 m$^2$/g. Preferably the area specific resistance is no greater than 4.3 ohm-cm$^2$, more preferably no greater than 4.0 ohm-cm$^2$, and most preferably no greater than 3.5 ohm-cm$^2$. These properties are described in greater detail in U.S. patent application Ser. No. 10/719,425, filed on Nov. 21, 2003, which is hereby incorporated by reference.

Separator membranes for use in lithium batteries are often polymeric separators made of polypropylene, polyethylene or ultrahigh molecular weight polyethylene, with polyethylene being preferred. The separator can be a single layer of biaxially oriented microporous membrane, or two or more layers can be laminated together to provide the desired tensile strengths in orthogonal directions. A single layer is preferred to minimize the cost. Suitable single layer biaxially oriented polyethylene microporous separator is available from Tonen Chemical Corp., available from EXXON Mobile Chemical Co., Macedonia, N.Y., USA. Setela F20DHI grade separator has a 20 μm nominal thickness, and Setela 16MMS grade has a 16 μm nominal thickness.

The negative electrode, positive electrode and separator strips are combined together in an electrode assembly. The electrode assembly may be a spirally wound design, such as that shown in FIG. 1, made by winding alternating strips of positive electrode, separator, negative electrode and separator around a mandrel, which is extracted from the electrode assembly when winding is complete. At least one layer of separator and/or at least one layer of electrically insulating film (e.g., polypropylene) is generally wrapped around the outside of the electrode assembly. This serves a number of purposes: it helps hold the assembly together and may be used to adjust the width or diameter of the assembly to the desired dimension. The outermost end of the separator or other outer film layer may be held down with a piece of adhesive tape or by heat sealing. The negative electrode can be the outermost electrode, as shown in FIG. 1, or the positive electrode can be the outermost electrode. Either electrode can be in electrical contact with the cell container, but internal short circuits between the outmost electrode and the side wall of the container can be avoided when the outermost electrode is the same electrode that is intended to be in electrical contact with the can.

In one or more embodiments of the present invention, the electrode assembly is formed with the positive electrode having electrochemically active material selectively deposited thereon for improved service and more efficient utilization of the electrochemically active material of the negative electrode. Non-limiting examples of selectively deposited configurations of electrochemically active material on the positive electrode and further, an electrochemical cell, including a positive container, are set forth in U.S. Publication No. 2008/0026288, published on Jan. 31, 2008 and U.S. Publication No. 2008/0026293, published on Jan. 31, 2008, both fully herein incorporated by reference.

Rather than being spirally wound, the electrode assembly may be formed by folding the electrode and separator strips together. The strips may be aligned along their lengths and then folded in an accordion fashion, or the negative electrode and one electrode strip may be laid perpendicular to the positive electrode and another electrode strip and the electrodes alternately folded one across the other (orthogonally oriented), in both cases forming a stack of alternating negative electrode and positive electrode layers.

The electrode assembly is inserted into the housing container. In the case of a spirally wound electrode assembly, whether in a cylindrical or prismatic container, the major surfaces of the electrodes are perpendicular to the side wall(s) of the container (in other words, the central core of the electrode assembly is parallel to a longitudinal axis of the cell). Folded electrode assemblies are typically used in prismatic cells. In the case of an accordion-folded electrode assembly, the assembly is oriented so that the flat electrode surfaces at opposite ends of the stack of electrode layers are adjacent to opposite sides of the container. In these configurations the majority of the total area of the major surfaces of the negative electrode is adjacent the majority of the total area of the major surfaces of the positive electrode through the separator, and the outermost portions of the electrode major surfaces are adjacent to the side wall of the container. In this way, expansion of the electrode assembly due to an increase in the combined thicknesses of the negative electrode and positive electrode is constrained by the container side wall(s).

A nonaqueous electrolyte, containing water only in very small quantities as a contaminant (e.g., no more than about 500 parts per million by weight, depending on the electrolyte salt being used), is used in the preferred electrochemical cells of the invention. Any nonaqueous electrolyte suitable for use with lithium and active positive electrode material may be used. The electrolyte contains one or more electrolyte salts dissolved in an organic solvent. For a Li/FeS$_2$ cell, examples of suitable salts include lithium bromide, lithium perchlorate, lithium hexafluorophosphate, potassium hexafluorophosphate, lithium hexafluoroarsenate, lithium trifluoromethanesulfonate and lithium iodide; and suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide and ethers. The salt/solvent combination will provide sufficient electrolytic and electrical conductivity to meet the cell discharge requirements over the desired temperature range. Ethers are often desirable because of their generally low viscosity, good wetting capability, good low temperature discharge performance and good high rate discharge performance. This is particularly true in Li/FeS$_2$ cells because the ethers are more stable than with MnO$_2$ positive electrodes, so higher ether levels can be used. Suitable ethers include, but are not limited to acyclic ethers such as 1,2-dimethoxyethane, 1,2-diethoxyethane, di(methoxyethyl)ether, triglyme, tetraglyme and diethyl ether; and cyclic ethers such as 1,3-dioxolane, tetrahydrofuran, 2-methyl tetrahydrofuran and 3-methyl-2-oxazolidinone.

Specific negative electrode, positive electrode and electrolyte compositions and amounts can be adjusted to provide the desired cell manufacturing, performance and storage characteristics, as disclosed in U.S. patent application Ser. No. 10/719,425, which is referenced above.

Methods for assembly of the electrochemical cells of the present invention include inserting the electrode assembly and preferably an insulating member into the cell container. An initial bead is formed in the sidewall of container. The bead is formed in one embodiment by pressing a forming wheel against the sidewall of the container in the area it is desired to form the bead while the can is rotated around its axial axis. Electrolyte is dispensed into the container prior to insertion of the end assembly into container, when a foil vent is utilized. Alternatively, if a ball vent is utilized in end assembly, the electrolyte can be added prior to internal sealing of the cell with the ball of the ball vent. The peripheral portions of the end assembly are seated on the upper wall of the initial bead formed. In a further step, the container is supported at the initial bead. The bead support has a protruding ledge that is inserted into the bead. The bead support in one embodiment consists of two halves and each extends preferably 180° around the bead so that the bead is fully supported around the circumference of the cell and the support can be opened and closed in the process. The container is also supported at the bottom of the container. Various seal member surfaces, both radial and axial, i.e., perpendicular to the radial direction, are advantageously sealed against other adjacent components of the closure assembly during the closing process. A further step of closing the cell and forming the upwardly inclined bead involves the diameter reduction of the upper sidewall by a redraw or collet process. In this process, the container is constrained or supported both at the top end and the bottom. In some embodiments, the support at the container bottom can lift upward during the process of diameter reduction. The diameter reduction and bottom lifting cause extra material flow into the bead that is further deformed or worked radially inwardly and the bead forms the desired upwardly inclined inwardly projecting upper wall. After diameter reduction, the upper end of the container is also folded inwardly to form a crimped end and axial forces are applied between the bead and crimped end. In the crimping process, the container is also supported at the bottom. Radial compression is preferably maintained on at least the upper sidewall during crimping of the upper end of the container.

The result of the cell forming and closing processes are illustrated in the drawings. Geometries of the parts and the closing processes insure that the desired interfaces between the seal member and the container, seal member and the current limiting or interrupting member, and the seal member and the contact member or inner cover outer diameter are all sealed. The contact member and/or inner cover are designed such that it seals a large portion of the seal member surface area that otherwise would be exposed to electrolyte. The gasket thickness is minimized. The relatively deep bead depth and relatively small seal member thickness aid in minimizing vapor transmission and increase the path length for vapor transmission. The circumferential upwardly tapered inward bead projection provides enhanced sealing force and further reduces the chance of electrochemical cell leakage. This is especially true when the cell is exposed to temperature fluctuation causing expansion and contraction of cell components, especially in the polymeric seal member. The upwardly tapered inward bead upper wall has more tendency to spring back to its original position after the expansion.

The above description is particularly relevant to cylindrical Li/FeS$_2$ cells, such as FR6 and FR03 types, as defined in International Standards IEC 60086-1 and IEC 60086-2, published by the International Electrotechnical Commission, Geneva, Switzerland. However, the invention may also be adapted to other cell sizes and shapes and to cells with other electrode assembly, housing, seal and pressure relief vent member designs. Other cell types in which the invention can be used include primary and rechargeable nonaqueous cells, such as lithium/manganese dioxide and lithium ion cells. The electrode assembly configuration can also vary. For example, it can have spirally wound electrodes, as described above, folded electrodes, or stacks of strips (e.g., flat plates). The cell shape can also vary, to include cylindrical and prismatic shapes, for example. Other cell chemistries such as, but not limited to, Li/SO$_2$, Li/AgCl, Li/V$_2$O$_5$, Li/MnO$_2$, Li/Bi$_2$O$_3$ can be utilized. These batteries could have a nominal voltage higher than 1.50 V such as 2.0 V and 3.0 V.

It will be understood by those who practice the invention and those skilled in the art that various modifications and improvements may be made to the invention without departing from the spirit of the disclosed concepts. The scope of protection afforded is to be determined by the claims and by the breadth of interpretation allowed by law.

What is claimed is:

1. An electrochemical cell, comprising:
    a cylindrical metal container having a closed bottom end, a sidewall and an open end;
    a spirally wound electrode assembly disposed within the container, said electrode assembly comprising a positive electrode, a negative electrode consisting essentially of lithium or a lithium alloy, a separator disposed between the positive and negative electrodes, and a non-aqueous volatile electrolyte;
    a circumferential inward projection in the sidewall and having an upper wall and a lower wall connected by a transition member, the upper wall inclined upwardly towards a radial center of the cell, and the upper wall spaced apart from the lower wall along their respective lengths;
    an end assembly closing the open end of the container, the end assembly comprising a vent member capable of venting at a predetermined internal pressure, a current limiting or interrupting member, and an insulating, polymeric seal member located between the container and a conductive contact of the end assembly, and wherein the conductive contact is operatively electrically connected to the positive electrode or negative electrode; and
    wherein the bead upper wall has a lowermost point located radially outward from an upper wall uppermost point, and wherein an angle between an imaginary horizontal line extending through upper wall lowermost point and an imaginary line between upper wall lowermost point and upper wall uppermost point is from 1° to 30°; and
    wherein one of (a) and (b) applies:
        a) (i) the contact assembly further includes a conductive contact member having a peripheral flange connected to a pressure release vent member, the pressure release vent member capable of rupturing in response to internal cell pressure that is at least as high as a predetermined release pressure thereby allowing matter to escape through the vent member, (ii) the peripheral flange includes an axial segment that extends an axial distance substantially parallel to a segment of the sidewall adjacent thereto and a radial segment extends from the axial segment in a substantially radial direction and includes a portion located axially above the bead so that the peripheral flange transitions from the radial segment to a second lower axial segment in a substantially axial direction at least 0.25 mm axially below the upper wall uppermost point of the bead, and (iii) the seal member is under compression between at least (a) the sidewall and peripheral flange axial segment, (b) the bead and the radial segment, and (c) the bead and the second lower axial segment; and b) (i) the end assembly further includes a conductive inner cover in operative electrical contact with the conductive contact and having first and second axial segments, with the second axial segment located radially inwardly from the first axial segment and having a difference in length of less than 20% in comparison to the first axial segment, and a radial segment connecting the first and second axial segments, and (ii) the seal member is compressed between the radial segment and the upper wall of the bead and between the inner cover axial segments and an upper sidewall of the container.

2. The electrochemical cell according to claim 1, wherein the angle is from 3° to 20°.

3. The electrochemical cell according to claim 1, wherein the bead has a depth that is at least 22% of a maximum radius of the container.

4. The electrochemical cell according to claim 3, wherein the bead depth is about 30% of the radius of the container.

5. The electrochemical cell according to claim 1, wherein a conductive contact member is connected to the inner cover and operatively electrically connected to a current collector of the positive electrode, wherein the cell further includes an insulating member that prevents contact between a portion of a positive electrode current collector and the sidewall of the container, and wherein a portion of the insulating member is in contact with and disposed between the bead and the contact member.

6. The electrochemical cell according to claim 1, wherein the inner cover includes a segment which forms a portion of a ball vent assembly.

7. The electrochemical cell according to claim 1, wherein the positive electrode comprises iron disulfide, and wherein the cell is a R6 size cell and the seal member has a dimensional ratio of less than 1.14 cm.

8. The electrochemical cell according to claim 7, wherein the dimensional ratio is less than 0.86 cm.

9. The electrochemical cell according to claim 7, wherein the dimensional ratio is less than 0.51 cm.

10. The electrochemical cell according to claim 1, wherein the cell further includes an insulating member in contact with the sidewall of the container below the bead and in contact with the contact member so that a portion of the seal member is bounded by the contact member, the insulating member and the bead.

11. The electrochemical cell according to claim 1, wherein the contact member has an inwardly folded end extending from the axial segment, wherein a retainer defining an opening is present in the cell, and wherein a portion of the retainer and a portion of the vent member are compressed between the contact member inwardly folded end and the radial segment.

12. The electrochemical cell according to claim 1, wherein the pressure release vent member is a foil vent member and comprises at least a first layer of a composition comprising one or more of a metal and a polymer.

13. The electrochemical cell according to claim 12, wherein the pressure release vent member comprises a second layer comprising a composition selected from the group consisting of: polyethylene, polypropylene, polybutylene, terephthalate, polyethylene terephthalate, ethylene acrylic acid, ethylene methacrylic acid, polyethylene methacrylic acid, and mixtures thereof, and wherein the pressure release vent member comprises a third layer, the first layer being disposed between the second layer and the third layer, and the third layer comprising a composition selected from the group consisting of: polyethylene, polypropylene, polybutylene, terephthalate, polyethylene terephthalate, ethylene acrylic acid, ethylene methacrylic acid, polyethylene methacrylic acid, and mixtures thereof.

14. The electrochemical cell according to claim 13, wherein the first layer comprises aluminum.

15. The electrochemical cell according to claim 1, wherein the positive electrode comprises $FeS_2$.

16. The electrochemical cell according to claim 1, wherein the seal member has an upper radial segment extending in a substantially radial direction situated below a crimped end of the container, wherein the seal member upper radial segment is connected to a seal member upper axial segment extending in a substantially axial direction and in contact with the container sidewall, wherein the seal member upper axial segment extends between the crimped end and the upper wall of the inward projection, wherein the seal member includes a lower radial segment connected to and extending substantially radially inwardly from the upper axial segment, wherein a lower axial segment of the seal member is connected to and extends substantially axially downward from the lower radial segment, wherein the seal member upper radial segment and lower radial segment are compressed between the inward projection upper wall and crimped end of the container, and wherein the seal member lower axial segment is compressed between the transition member and an inner cover or contact member.

17. The electrochemical cell according to claim 1, wherein the seal member has an upper radial segment extending in a substantially radial direction situated below a crimped end of the container, wherein the seal member upper radial segment is connected to a seal member upper axial segment extending in a substantially axial direction and in contact with the container sidewall and the peripheral flange axial segment, wherein the seal member upper axial segment extends between the crimped end and the upper wall of the inward projection, wherein the seal member includes a lower radial segment connected to and extending substantially inwardly from the seal member upper axial segment, wherein the seal member lower radial segment is in contact with and extends a distance along the peripheral flange radial segment, wherein a lower axial segment of the seal member is connected to and extends axially downward from the seal member lower radial segment, wherein the upper radial segment and lower radial segment are compressed between the inward projection upper wall and crimped end of the container, and wherein the seal member lower axial segment is compressed between the transition member of the inward projection and the lower axial segment of the contact member.

18. The electrochemical cell according to claim 1, wherein the seal member has an upper radial segment extending in a substantially radial direction situated below a crimped end of the container, wherein the seal member upper radial segment is connected to an upper axial segment of the seal member extending in a substantially axial direction and in contact with the container sidewall, wherein the upper axial segment extends between the crimped end and the upper wall of the inward projection and is in contact with the inner cover axial segment, wherein the seal member includes a lower radial segment connected to and extending substantially radially inwardly from the seal member upper axial segment, wherein the seal member lower radial segment is in contact with the radial segment of the inner cover and compressed between the inner cover and the upper wall of the inward projection, wherein the seal member upper radial segment is compressed between the inward projection upper wall and crimped end of the container, and wherein the seal member further includes an inner axial segment connected to the seal member lower radial segment that extends substantially radially upwardly between the axial segment of the inner cover and a contact member of the cell.

* * * * *